United States Patent
Muensterer et al.

(10) Patent No.: US 8,803,727 B2
(45) Date of Patent: Aug. 12, 2014

(54) METHOD FOR PRODUCING SENSOR-SUPPORTED, SYNTHETIC VISION FOR LANDING SUPPORT OF HELICOPTERS UNDER BROWN-OUT OR WHITE-OUT CONDITIONS

(75) Inventors: Thomas Muensterer, Tettnang (DE); Matthias Wegner, Friedrichshafen (DE); Peter Kielhorn, Friedrichshafen (DE)

(73) Assignee: EADS Deutschland GmbH, Ottobrunn (DE)

( * ) Notice: Subject to any disclaimer, the term of this patent is extended or adjusted under 35 U.S.C. 154(b) by 264 days.

(21) Appl. No.: 13/386,738

(22) PCT Filed: Jun. 29, 2010

(86) PCT No.: PCT/DE2010/000754
§ 371 (c)(1),
(2), (4) Date: Jan. 24, 2012

(87) PCT Pub. No.: WO2011/012102
PCT Pub. Date: Feb. 3, 2011

(65) Prior Publication Data
US 2012/0127014 A1      May 24, 2012

(30) Foreign Application Priority Data

Jul. 29, 2009 (DE) .......................... 10 2009 035 191

(51) Int. Cl.
*G01S 13/00* (2006.01)
*G01S 13/08* (2006.01)

(52) U.S. Cl.
USPC ................. 342/33; 342/22; 342/63; 342/120; 342/159; 342/175; 342/189

(58) Field of Classification Search
CPC ..... G01S 13/913; G01S 13/94; G01S 13/867; G01S 17/89; G01S 13/89; G01S 13/86; G01S 7/062; G01S 7/51; G05D 1/102; G05D 1/0676; G05D 1/0858

USPC ......... 342/63–65, 70–72, 120, 121, 159–164, 342/175–186; 701/3, 16

See application file for complete search history.

(56) References Cited

U.S. PATENT DOCUMENTS

| | | | |
|---|---|---|---|
| 3,934,250 A * | 1/1976 | Martin, Jr. | 342/42 |
| 6,101,431 A * | 8/2000 | Niwa et al. | 701/14 |

(Continued)

FOREIGN PATENT DOCUMENTS

| | | |
|---|---|---|
| DE | 100 15 164 A1 | 10/2001 |
| DE | 10 2004 051 625 B4 | 8/2006 |

(Continued)

OTHER PUBLICATIONS

Colucci, Frank, "Digging Out from Brownout: DARPA and the US military look to enhance situational awareness and helicopter stability to penetrate dust clouds.", Safety Spotlight, 2007, vol. 53, No. 1, pp. 50-55 (six (6) sheets).

(Continued)

*Primary Examiner* — Peter Bythrow
(74) *Attorney, Agent, or Firm* — Crowell & Moring LLP

(57) ABSTRACT

A method for producing a sensor-supported, synthetic view for landing support of helicopters under brown-out or white-out conditions is provided. A virtual 3-D representation of the landing zone is continuously created from 3-D data of the intended landing zone recorded during the landing approach and a monitoring routine is available to ensure that no 3-D data that was produced under brown-out or white-out conditions is considered in the representation. As soon as the monitoring routine detects that 3-D data has been recorded under brown-out or white-out conditions, an additional radar sensor is activated to continuously produce distance and/or Doppler data of potential objects entering the landing zone, the objects being displayed to a pilot of the landing helicopter in the synthetic view.

7 Claims, 2 Drawing Sheets

(56) References Cited

U.S. PATENT DOCUMENTS

| | | | |
|---|---|---|---|
| 7,106,217 B2* | 9/2006 | Judge et al. | 340/973 |
| 7,365,652 B2* | 4/2008 | Scherbarth | 340/974 |
| 7,642,929 B1* | 1/2010 | Pinkus et al. | 340/973 |
| 7,692,571 B2* | 4/2010 | Lovberg et al. | 342/52 |
| 8,035,547 B1* | 10/2011 | Flanigan et al. | 342/36 |
| 2004/0183697 A1* | 9/2004 | Rogers et al. | 340/971 |
| 2004/0217883 A1* | 11/2004 | Judge et al. | 340/946 |
| 2006/0087452 A1* | 4/2006 | Scherbarth | 340/974 |
| 2007/0086657 A1* | 4/2007 | Harder et al. | 382/199 |
| 2008/0215204 A1* | 9/2008 | Roy et al. | 701/28 |
| 2009/0002220 A1* | 1/2009 | Lovberg et al. | 342/33 |
| 2009/0138138 A1* | 5/2009 | Ferren et al. | 701/3 |
| 2009/0140885 A1* | 6/2009 | Rogers et al. | 340/977 |
| 2010/0156758 A1* | 6/2010 | Anders | 345/8 |
| 2013/0050485 A1* | 2/2013 | Tiana | 348/144 |

FOREIGN PATENT DOCUMENTS

| | | |
|---|---|---|
| DE | 10 2007 014 878 A1 | 10/2008 |
| EP | 1 650 534 A1 | 4/2006 |
| EP | 1 906 151 A2 | 4/2008 |
| EP | 1 972 896 A2 | 9/2008 |
| WO | WO 2005/015333 A2 | 2/2005 |
| WO | WO 2008/002875 A2 | 1/2009 |
| WO | WO 2009/081177 A2 | 7/2009 |

OTHER PUBLICATIONS

International Search Report with English translation dated Jan. 18, 2011 (six (6) sheets).

\* cited by examiner

METHOD FOR PRODUCING SENSOR-SUPPORTED, SYNTHETIC VISION FOR LANDING SUPPORT OF HELICOPTERS UNDER BROWN-OUT OR WHITE-OUT CONDITIONS

BACKGROUND AND SUMMARY OF THE INVENTION

The invention relates to a method for producing a sensor-supported, synthetic view for landing support of helicopters under brown-out or white-out conditions.

During take-offs and landings of helicopters in dry desert-like or snow-covered areas, visibility is suddenly severely impaired during the final phase of the landing owing to the stirred up dust or snow. This effect is called brown-out or white-out. The visual ranges may in this case decrease within split seconds from VFR (visual flight rules) conditions to a visual range of less than a meter. The pilot loses orientation of his attitude, his altitude above the ground and also his own movements in relation to the ground (drift). A further problem is that situational awareness is completely lost, both in terms of static obstacles and with regard to obstacles that move towards the helicopter in the dust cloud. Accidents as a result of this are the biggest single cause of helicopter losses in the military field in these areas.

German Patent Document DE10 2004 051 625 B4 describes a general approach for generally solving the brown-out problem. This concept includes the use of a high-resolution 3-D sensor to produce a 3-D representation of the landing zone during the landing approach. No more new data is recorded after entry into the brown-out situation. Instead, the existing data is presented as a synthetic view of the landing zone together with the movement of the helicopter. This approach corresponds to the "see-and-remember concept", which is often criticized by operational pilots, however, because changes in the landing zone once the dust cloud has been entered are no longer detected. During use, pilots reported many near-accidents as a result of vehicles or groups of people moving or running towards the helicopter, whilst it was still in the air, the pilot being unable to see them owing to the dust cloud.

International Patent Application Publication WO 2005/015333A3 describes a concept similar to DE 10 2004 051 625 B4. However, in this instance, the concept is described with much more focus on technical implementation with a plurality of sensor-suites in the context of the helicopter system as a whole. The solution presented in this instance relates primarily to a technical overall concept for a brown-out recovery system, wherein the connection of this system to an internal helicopter databus and the link to mission-specific information are highlighted.

European Patent Document EP 1 906 151 A1 also describes a method for pilot support by "see-and-remember". In this case image sequences from one or more 2-D cameras are used as a database for "see-and-remember" representation. In addition to the abovementioned drawbacks in the event of changes after entering into brown-out, this poses the additional drawback that three-dimensional obstacles are displayed in a distorted manner, that is to say as texture, under otherwise optimal conditions.

Exemplary embodiments of the present invention are directed to displaying to the pilot sudden dangers entering the landing zone, during the final phase of the landing approach in the brown-out cloud.

The invention proceeds from a method for pilot support during helicopter landings in visual flight under brown-out or white-out conditions, as is known from DE 10 2004 051 625 B1. According to the present invention, an additional radar sensor, for example an electronically scanning radar, is activated as soon as the monitoring routine detects that 3-D data has been recorded under brown-out or white-out conditions. This radar sensor continuously supplies data to continuously produce distance and/or Doppler data of potential objects entering the landing zone. These objects are displayed to the pilot of the landing helicopter as symbols in the synthetic view.

BRIEF DESCRIPTION OF THE DRAWING FIGURES

The invention and advantageous embodiments will be explained hereinafter with reference to drawings, in which.

DETAILED DESCRIPTION

Figure 1:
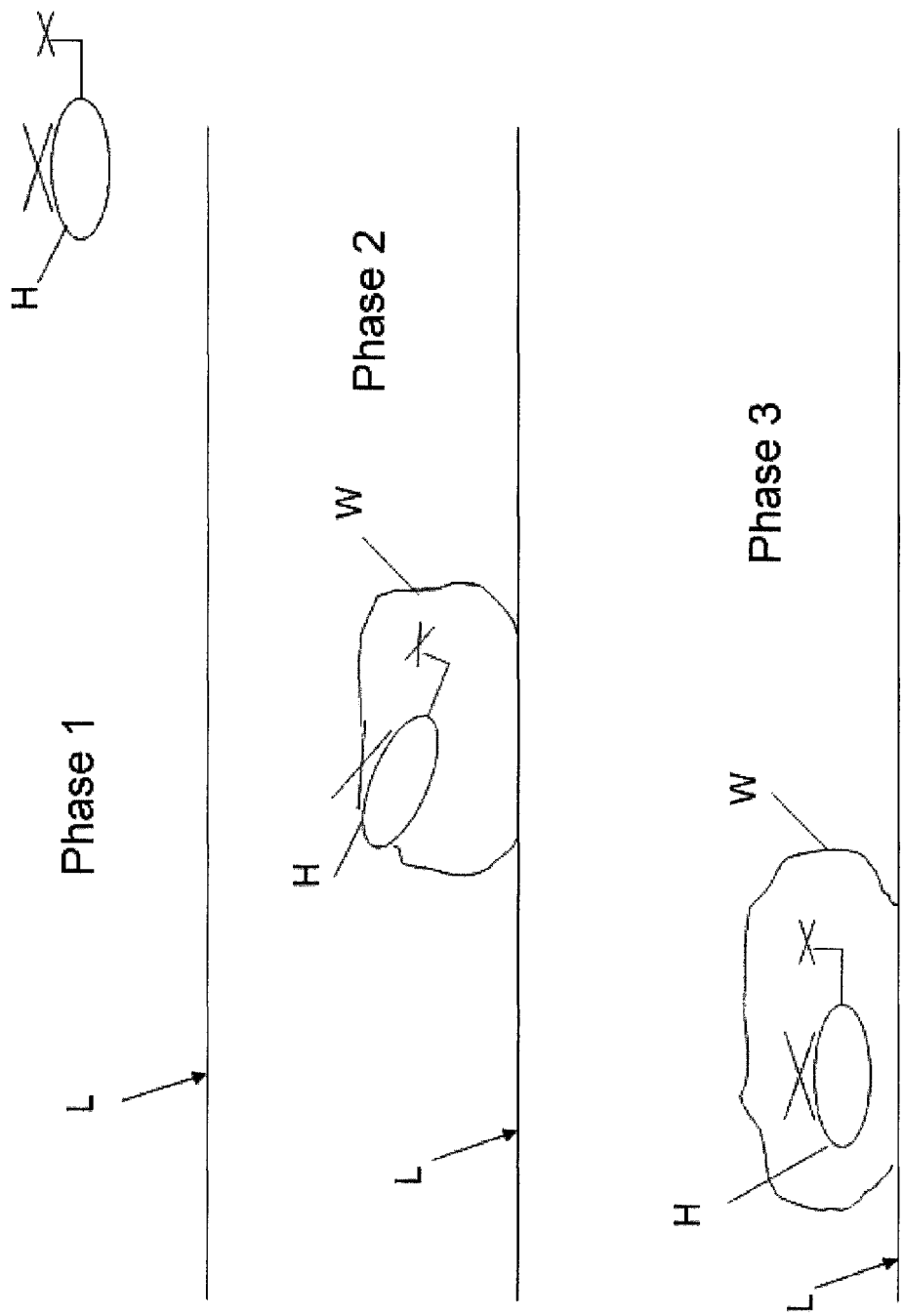
FIG. 1 shows the phases of a typical landing under brown-out conditions.

The landing approach of helicopters H under brown-out or white-out conditions can be roughly divided into 3 phases. Phase 1 is the approach to the landing site L, generally at a defined ink rate on a defined glide path comparable to the descent of a fixed-wing aircraft. Phase 2 consists of a relatively abrupt maneuver to reduce the forward speed at altitudes between 20 and 100 ft. above ground. The reduction in forward speed is normally achieved by a "nose-up maneuver", in which the pitch angle of the helicopter H is sharply increased temporarily. Different publications present this moment in time as that at which the helicopter H is overtaken by the brown-out cloud W, which still trails behind in phase 1. The helicopter H is now in the brown-out state with largely restricted, sometimes even completely lost external vision as well as the complete loss of the ground reference. Phase 3 is the actual landing process with no or very little forward speed until the helicopter H has been completely landed. The described phases of a brown-out landing are schematically illustrated in FIG. 1.

A method for producing a high-resolution, sensor-supported, synthetic view for landing support as described in German patent DE10 2004 051 625 B4 produces, in phase 1 and at the start of phase 2, a large amount of 3-D data regarding the landing zone L, which is displayed after entry into the brown-out cloud and in phase 3 in a attitude-corrected and chronologically and geometrically correct manner (see-and-remember concept).

Figure 2:
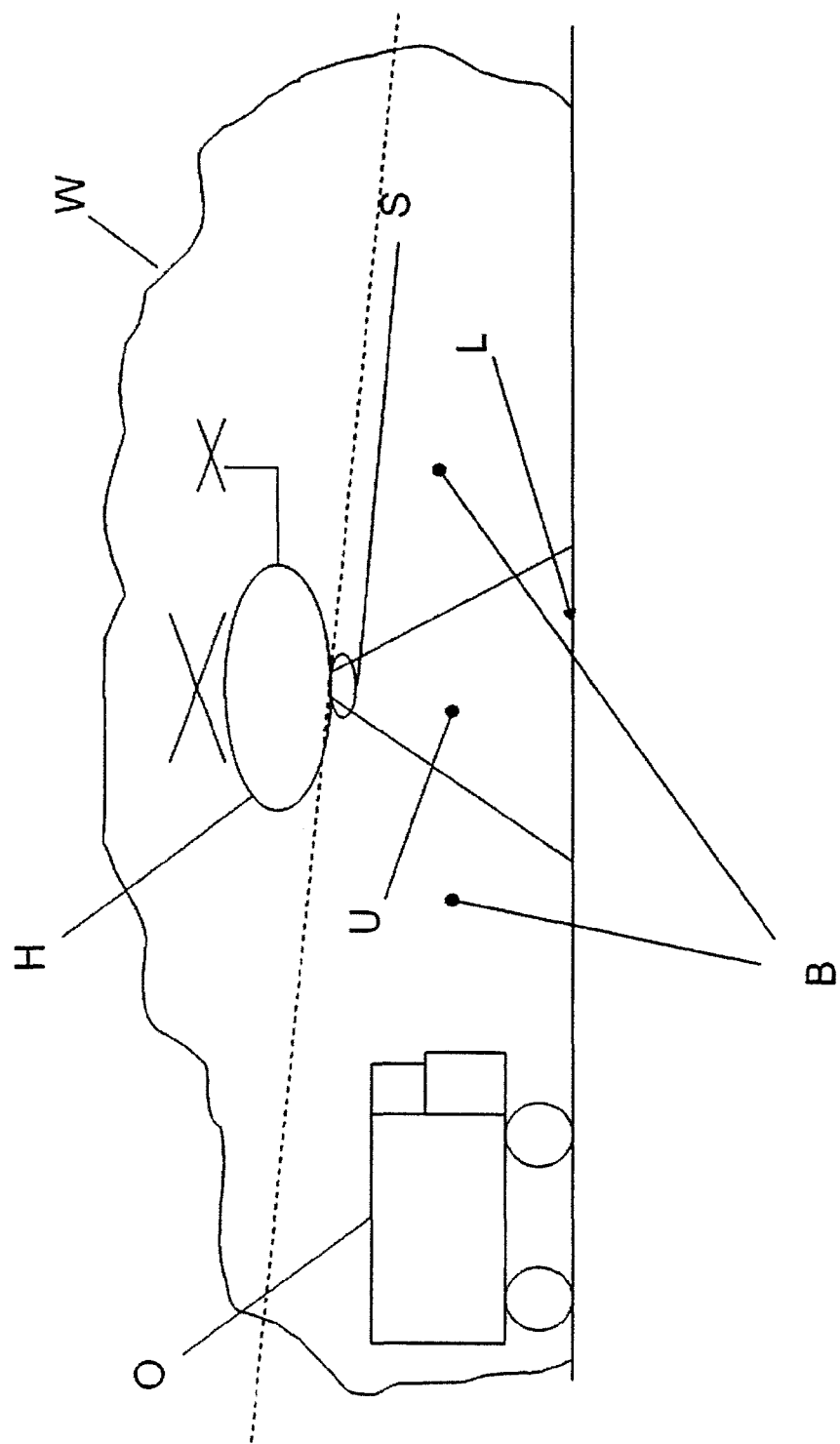
FIG. 2 shows a view of a landing zone monitored in accordance with the method according to the invention.

The invention covers the existing dangers in phases 2 and 3 by an additional sensor S (see FIG. 2). For example, this sensor may be an omnidirectional scanning radar and expediently penetrates through dust. As a result of this additional sensor S, dangers O not previously existing in the landing area L are also warned against in phases 2 and 3. The warning may be relatively coarse, similarly to the warning as given by a parking aid for cars.

The additional sensor S is activated as soon as the monitoring routine for the 3-D sensor detects that 3-D data has been recorded under brown-out or white-out conditions. At the latest, the additional sensor is therefore activated upon entry into phase 2 and records distance and possibly Doppler data. This additional sensor, which is basically designed as a dust-penetrating sensor, is for example a scanning radar in the millimetric wave range with good resolution in the horizontal direction (for example 1° to 3° beam divergence) and broadened beam in the vertical direction (for example 15° to up to 50°).

FIG. 2 shows a schematic sectional view of the field of view of the additional sensor and a possible risk scenario. As shown in FIG. 2, it is not absolutely essential for the area U directly below the helicopter H to be monitored by the additional sensor S. The reason for this lies in the fact that the pilot continuously checks visually during the final approach and before entry into phase 2 whether the landing zone is free from obstacles and dangers. For this purpose, an area B in front of, behind and beneath the helicopter H is monitored. Should the area B not be free from dangers O, the landing is immediately aborted by a "go-around maneuver". If a danger O thus enters the dust cloud W in phase 2 or 3, it approaches the landing helicopter H from the edge of the landing zone L, as illustrated in FIG. 2.

For the described method of the present invention, no sensor imaging in two dimensions is likewise required for the additional radar sensor S. The type of danger suddenly entering (truck, car, human, rolling fuel barrel, etc.) is also just as irrelevant to the pilot within the brown-out cloud as the precise direction from which the danger O approaches the helicopter H. For this reason the warning is advantageously given within the scope of the synthetic view using a simple, two-dimensional or linear symbol in the direction of the threat (for example by coloring a sector or a quadrant in relation to the longitudinal axis of the helicopter). To reduce the workload for the pilot, the lateral distance of the threat from the helicopter may advantageously be displayed by a changing (two- or multi-stage) blinking rate of the corresponding warning symbol.

A system on which the method according to the invention can run also consists of a processor unit that processes the respective data of this system, in addition to the sensor for recording the 3-D data (not shown), a navigation system (not shown) and the additional sensor S.

One problem with the fully automated evaluation of the data is that the radar data contains significant backscatter signals from the ground of the landing zone and from small objects that do not pose a risk to the helicopter during the landing; however the display thereof would unnecessarily increase the pilot's workload.

In order to experience as few false alarms as possible, the data of successive scans from the additional sensor is corrected for accurate attitude and position in accordance with the change in position of the helicopter with the aid of the navigation system, as is already described for the synthetic view in document DE 10 2004 051 625 B4. Effects caused by the movement of the helicopter itself are thus compensated for.

Objects moving into the landing zone or that continue to move within the landing zone can be extracted from the radar data from the additional sensor. From this, the processor unit produces a warning to the pilot. In addition, the Doppler information from the radar can be used to identify moving objects. For this purpose, the Doppler signals generated by the movement of the helicopter itself have to be excluded with the aid of the navigation data within the processor unit.

In order to further eliminate false alarms caused by ground reflections, the 3-D data produced for the synthetic view can also be processed and classified so as to obtain a high-resolution obstacle or object map of the landing zone. Objects in this map can now be correlated with the generally coarse and poor-resolution echoes from the additional sensor. For this purpose, synthetic radar echoes from these known and displayed objects can be calculated using the object map. This result can be compared with the actual data from the radar to further increase the efficiency and reliability in the elimination of false alarms. This combination of 3-D information from the data from the sensor for recording 3-D data and the data from the additional radar sensor makes it possible to obtain a very high warning reliability with a relatively simple additional sensor (scanning in only one direction).

It may also be advantageous to check for each significant echo from the radar within the landing zone whether there is an object for this in the high-resolution 3-D data from the 3-D sensor. This means that, when advantageous, the above method is reversed.

Alternatively to a dust-penetrating radar, other distance sensors with coarse resolution, such as stereo cameras or gated viewing cameras may also be used. However, these optical sensors can be used only if the brown-out cloud is not too strongly absorbed or scattered in the wavelength range used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for producing a sensor-supported, synthetic view for landing support of a helicopter under brown-out or white-out conditions, comprising:
   continuously creating a virtual 3-D representation of a landing zone from 3-D data of the landing zone recorded during a landing approach, wherein 3-D data produced under brown-out or white-out conditions is excluded from the virtual 3-D representation,
   activating a radar sensor as soon as a monitoring routine detects that 3-D data has been recorded under brown-out or white-out conditions, wherein the radar sensor continuously produces distance or Doppler data of potential objects entering the landing zone during the brown-out or white-out conditions; and
   displaying, using the distance or Doppler data produced by the radar sensor during the brown-out or white-out conditions, the potential objects to a pilot of the landing helicopter in the synthetic view.

2. The method as claimed in claim 1, further comprising:
   correcting the data produced by the radar sensor using position and attitude data of the helicopter.

3. The method according to claim 1, wherein the radar sensor is a scanning radar in the millimetric wave range with a beam divergence of 1-3° in the horizontal direction and 15-50° in the vertical direction.

4. The method according to claim 1, wherein the radar sensor is an electronically scanning radar.

5. The method according to claim 1, wherein an object detected by the radar sensor is displayed to the pilot in the synthetic view as a two-dimensional or linear symbol.

6. The method according to claim 1, wherein an object detected by the radar sensor is displayed to the pilot in the synthetic view by coloring a sector or a quadrant in relation to a longitudinal axis of the helicopter.

7. The method according to claim 1, wherein in order to avoid false alarms, the 3-D data is processed and classified to identify objects in the landing zone, and synthetic radar data correlated with the measured radar data is produced on the basis of the classified objects.

* * * * *